United States Patent [19]
Whiteley et al.

[11] Patent Number: 6,096,804
[45] Date of Patent: Aug. 1, 2000

[54] LOW-DENSITY POLYMERIC COMPOSITION

[75] Inventors: Richard Harold Whiteley, Highworth; Mark Sawyer; Stanley Kirkham, both of Swindon, all of United Kingdom

[73] Assignee: Raychem Limited, Swindon, United Kingdom

[21] Appl. No.: 09/142,103

[22] PCT Filed: Feb. 20, 1997

[86] PCT No.: PCT/GB97/00463

§ 371 Date: Aug. 31, 1998

§ 102(e) Date: Aug. 31, 1998

[87] PCT Pub. No.: WO97/31975

PCT Pub. Date: Sep. 4, 1997

[30] Foreign Application Priority Data

Mar. 1, 1996 [GB] United Kingdom ............ 9604411

[51] Int. Cl.[7] ............................................. C08J 9/32
[52] U.S. Cl. .............................................. 523/219
[58] Field of Search ................................ 523/218, 219

[56] References Cited

U.S. PATENT DOCUMENTS

| | | | |
|---|---|---|---|
| 4,110,554 | 8/1978 | Moore et al. | 174/101.5 |
| 4,273,806 | 6/1981 | Stechler et al. | 427/119 |
| 4,485,192 | 11/1984 | Gibbs et al. | 521/54 |
| 4,632,948 | 12/1986 | Yamada et al. | 523/219 |
| 4,963,420 | 10/1990 | Jarrin et al. | 428/36.9 |
| 5,196,246 | 3/1993 | Kauss | 428/39 |
| 5,246,783 | 9/1993 | Spenadel | 428/461 |

FOREIGN PATENT DOCUMENTS

| | | | |
|---|---|---|---|
| 0 390 148 A2 | 3/1990 | European Pat. Off. | C08J 3/20 |
| 0 443 400 A1 | 2/1991 | European Pat. Off. | C08K 9/04 |
| 0 549 827 A1 | 12/1991 | European Pat. Off. | C08K 7/22 |
| 0 552 789 A1 | 1/1993 | European Pat. Off. | C08L 67/06 |
| 0 557 807 A1 | 2/1993 | European Pat. Off. | C08K 7/22 |

OTHER PUBLICATIONS

Search Report dated May 22, 1996, for British Application No. GB 9604411.0.

Search Report mailed Jun. 10, 1997, for International Application No. PCT/GB 97/00463.

*Primary Examiner*—Paul R. Michl

[57] ABSTRACT

A low-density polymer composition and use thereof in undersea flotation cables and the like, the composition comprising by volume based on the whole composition, (a) at least 30% of a polymer component consisting of (i) thermoplastic polyolefin elastomer of room temperature density less than 0.9 g/cc and/or (ii) thermoplastic olefin/(ester or acid) copolymer elastomer, and (b) at least 30% of micro-balls of room-temperature density less than 0.6 g/cc, at least 80%, preferably at least 90%, more preferably at least 95%, by weight, of the micro-balls having a maximum dimension less than 300 $\mu$m, preferably less than 200 $\mu$m.

Preferred elastomers are metallocene-catalysed olefin copolymers of density 0.86–0.88 g/cc, and micro-balls of diameters 10–45, preferably 10–34, micrometers are advantageous in resisting pressures up to 50 MPa (5 km under sea).

19 Claims, No Drawings

LOW-DENSITY POLYMERIC COMPOSITION

BACKGROUND OF THE INVENTION

1. Field of the Invention

This invention relates to a low-density polymeric composition and its uses, for example as low-voltage electrical insulation, cable jacket material, buoyancy-adjusting filling for a cable or harness, dielectric material between the inner and outer conductors of a coaxial electrical cable, or thermal insulation.

2. Introduction to the Invention

Buoyant cables described in U.S. Pat. No. 4,963,420 and U.S. Pat. No. 4,110,554 use hollow glass micro-spheres to achieve low density combined with crush resistance for use in deep underwater operations. The micro-spheres are either compounded in ethylene or propylene polymers of density between 0.90 and 0.94 g/cc and extrusion-filled into the cable structure, as in U.S. Pat. No. 4,963,420; or are used alone to fill the interstices of the cable structure, thus avoiding difficulties which may occur when compounding the mixture of polymers and micro-spheres, but introducing other problems associated with the loose packing of micro-spheres.

SUMMARY OF THE INVENTION

The present invention relates to polymer/microsphere compositions which, at least in some cases, are surprisingly easy to process and may have advantageous properties for some or all of the aforementioned uses.

The invention accordingly provides a composition comprising, by volume based on the volume of the whole composition, (a) at least 30% of a polymer component consisting of thermoplastic polyolefin elastomer of room temperature density less than 0.9 g/cc and/or thermoplastic olefin/(ester or acid) copolymer elastomer, and (b) at least 30% of (preferably hollow) micro-balls of room-temperature density (not bulk density) less than 0.6 g/cc, at least 80%, preferably at least 90%, more preferably at least 95%, by weight, of the micro-balls having a maximum dimension less than 300 micrometers, preferably less than 200 micrometers.

DETAILED DESCRIPTION OF THE INVENTION

In preferred embodiments the composition comprises by volume at least 40%, more preferably at least 50%, or even up to 60%, of the micro-balls. The composition preferably comprises not more than 70% of the micro-balls.

It will be understood that the term "micro-balls" is used herein to avoid any suggestion that the micro-balls must be exactly spherical, since a certain amount of asphericity may be present in commercially available supplies of "microspheres" and may be tolerated in practice. It is, however, usually preferable that at least 50%, preferably at least 75%, more preferably substantially all, of the micro-balls are substantially spherical.

Advantageous processing and end-use properties have notably been found to occur when the room-temperature density of the polyolefin elastomer used according to the present invention is significantly less than the 0.9 g/cc minimum of the previously-used low-density polyolefins. It may therefore be advantageous if the density of the said polyolefin elastomer is less than 0.895 g/cc, preferably not more than 0.88 g/cc, more preferably within the range from 0.86–0.88 g/cc. The density will normally be measured by the method according to ISO 1183 (1987 Method A).

In the interests of achieving compositions of desirably low density, it is preferred that the density of the micro-balls is less than 0.5 g/cc, preferably less than 0.4 g/cc. The aforementioned restriction of the maximum dimension of the micro-balls to less than 300 $\mu$m means that the preferred substantially spherical micro-balls will have a diameter less than 300 $\mu$m. The micro-balls may be formed of any material suitable for the end purposes of the composition in question, but for optimum crush resistance and other properties it is generally preferred that the micro-balls are formed of glassy inorganic material. The balls may be entirely formed of foamed material, or may preferably be hollow with the shell formed of foamed or preferably solid material, provided that sufficiently low density for the present purposes is achieved. Commercially available inorganic micro-spheres marketed under the name of "fly ash", or the glass micro-spheres manufactured and marketed by the companies Emmerson and Cuming, 3M, or Glaverbell may be suitable in practice.

It is to be understood that the term "elastomer" as used herein is not to be interpreted too strictly, being intended to include materials other than those which are traditionally regarded as "rubbers". Relatively flexible polymers, for example those having elongation to break (determined as hereinafter described), before compounding with the micro-balls, of at least 300%, preferably at least 500%, more preferably at least 700%, and especially at least 900%, may be preferable. Polymers which, at 50% volume loading of the micro-balls, can retain at least 30%, preferably at least 50%, more preferably at least 70% and especially at least 80%, of their initial elongation have surprisingly been found among the polymers used for the compositions of the present invention. Similarly, polymers which, at 60% volume loading of the micro-balls, can retain at least 20%, preferably at least 50%, more preferably at least 70%, and especially at least 80%, of their initial elongation have also unexpectedly been found and are also preferred.

Advantageous polymers for the polymer component of the present compositions may also be selected from those wherein the crystallinity of the said elastomers determined by X-ray diffraction is less than 30%, preferably less than 20%, more preferably less than 10%. A wide-angle X-ray diffraction spectrum of the sample may be obtained using a 40 kV, 30 mA Philips PW1830 generator with a copper long fine focus tube; a Philips PW1820 goniometer with multi-purpose attachment and separate theta drive with PW1752 curved crystal secondary monochromator; slits of 1:0.2:1; data reduction with a Philips PW1710 in conjunction with APD software running on a VAX3100. The spectrum is deconvoluted using PW1869/20 profile fitting software to separate the broad amorphous halo from the relatively sharp peaks caused by the presence of crystalline material. The crystallinity is obtained by calculating the area under the relatively sharp peaks as a percentage of the area under the whole spectrum.

Advantageous polymers may also be selected from those having a relatively low modulus, preferably those wherein the modulus of the said elastomer(s) determined as hereinafter described is less than 100, preferably less than 50, more preferably less than 25 MPa. In order to achieve desirable strength for many purposes, it will be preferred that the said modulus is greater than 0.2, preferably greater than 0.5, more preferably greater than 1 MPa. It will in general be more preferable that the said modulus is greater than 2, preferably greater than 4, more preferably greater than 6

MPa. Especially preferred polymers may be those whose modulus is greater than 8 and/or those whose modulus is less than 20, preferably less than 18 MPa. Additionally or alternatively preferred polymers may be those whose modulus is less than trebled, preferably less than doubled, after compounding with a 50% volume loading of the micro-balls. Polymers whose modulus is increased to less than 5 times, preferably less than 3 times, its initial value at a 60% volume loading of the micro-balls may be especially advantageous.

In one preferred group of compositions according to this invention, the polyolefin elastomer comprises polyolefin homopolymer or olefin/olefin copolymer. Preferably, the polyolefin elastomer is a product of metallocene-catalysed polymerisation, preferably a metallocene-catalysed olefin/olefin copolymer, preferred examples of which are saturated ethylene/octene copolymers having crystallinity within the range from 4% to 6%, density within the range from 0.865 to 0.885 g/cc, modulus within the range from 7 to 9 MPa, and preferably a Melt Flow Index (MFI) of about 5 g/10 min. determined by ASTM D-1238 (presumably at 190° C. using a 2.16 kg weight). Another group of polyolefin elastomers which may be useful in the compositions of the present invention are hydrogenated polyolefin homopolymers or olefin-olefin copolymers.

A further group of useful polymers for the compositions of the present invention are those wherein the said olefin/(ester or acid) elastomer comprises a copolymer of ethylene with vinyl ester, preferably vinyl acetate, or with acrylic and/or methacrylic acid, or with acrylic and/or methacrylic esters, preferably $C_1$ to $C_4$ alkyl acrylates and/or methacrylates. Preferably, the said copolymer of ethylene contains from 25 to 75 mol % of the co-monomer.

For many purposes of the compositions according to this invention, it will be preferred that the said polymer component consists substantially only of the said polyolefin elastomer, or consists substantially only of the said olefin/(ester or acid) elastomer, or consists substantially only of a mixture of the said polyolefin elastomer and the said olefin/(ester or acid) elastomer. However, other polymers may in some cases be present, provided that those specified above remain the majority constituent by weight of the polymer component. The usual additives such as antioxidants, pigments, flame retardants, and so forth may be present in the usual percentages desirable for the end purposes of the composition in question.

The compositions according to the present invention may be processed by any convenient method which does not unacceptably affect their properties. For many purposes, the invention includes such a composition which has been melt processed, preferably melt extruded, under conditions which cause not more than 20%, preferably not more than 10%, more preferably not more than 5%, increase of the density of the processed composition (due to breakage of the micro-balls) compared with its theoretical density calculated from the densities and proportions of the said polymer component and micro-balls used. For example, the composition may have been melt extruded at a pressure not greater than 27.6 MPa (4000 psi), preferably not greater than 20.7 MPa (3000 psi), more preferably not greater than 13.8 MPa (2000 psi), or at even lower pressures if necessary to suit the micro-balls and polymers used.

By way of illustration of the selection of potentially suitable polymers for the present compositions, a traditional linear low-density polyethylene is excluded by virtue of its density of 0.92 g/cc and X-ray diffraction crystallinity of 40.6%. On the other hand, suitable metallocene-catalysed ethylene/butene copolymers are included by virtue of their density of 0.895 or 0.885 or 0.870 g/cc and crystallinity of 18 to 24% or less. More preferred grades of these polymers may be those of density about 0.885 g/cc and crystallinity about 17.9% or those of density about 0.880 g/cc and crystallinity about 13.0%. Much preferred, however, may be the metallocene-catalysed ethylene/octene copolymers having a density of about 0.87 g/cc and crystallinity about 5.5%, and those having density of about 0.868 g/cc and crystallinity of about 4.2%.

Polymer A, a metallocene-catalysed ethylene/octene copolymer having density about 0.87 g/cc and crystallinity about 5.5%, was compared with other polymers as shown below at 50% and 60% volume loadings of "Scotchlite" (Trademark) B38/4000 micro-spheres from 3M, these micro-spheres being preferred for their good balance of low density (0.38 g/cc) and resistance to pressure (>27.6 MPa). The comparison polymers were:

Polymer B, a conventional copolymer of ethylene and butene of density about 0.934 g/cc and modulus about 237 MPa with an MFI of 5 g/10 min.;

Polymer C, a thermoplastic ethylene/propylene elastomer of density about 0.89 g/cc and modulus about 17 MPa;

Polymer D, a low-density hydrogenated polyisoprene rubber with a multi-armed structure of density about 0.858 g/cc and modulus about 0.27 MPa.

The polymers with 0% (control), 50% and 60% volume loading of the microspheres were compounded in a Brabender H100 mixer as shown in the following table, with torque measured in units of gramme meters converted to units of Newton meters by multiplying the measured value by 0.0098.

| POLYMER —> | A | B | C | D |
|---|---|---|---|---|
| Rotor speed (rpm) | 30 | 30 for 5 min then 40 | 40 | 40 |
| Mixing time (min) | 10 | 15 | 20 | 18 |
| Set Temp (° C.) | 150 | 170 | 190 | 190 |
| Torque (control) | 9.8 | 19.6 | 14.7 | 9.8 |
| Torque (50 vol %) | 14.7 | 19.6 | 29.4 | 27.0 |
| Torque (60 vol %) | 19.6 | 24.5 | 41.7 | 31.9 |

The properties of the resulting compositions were tested as follows.

| Polymer | Ref. No. | Vol % spheres | Density (g/cc) | Eb (%) [% retention] | UTS (MPa) | Modulus (MPa) |
|---|---|---|---|---|---|---|
| A | 13-10 | 0 | 0.876 | 927 | 11.2 | 8.4 |
|   | 13-03 | 50 | 0.666 | 824 [88%] | 3.5 | 15.2 |
|   | 13-04 | 60 | 0.675 | 827 [89%] | 2.9 | 20.1 |
| B | 13-11R | 0 | 0.934 | 819 | 14.6 | 237 |
|   | 13-05 | 50 | 0.701 | 1.2 | 2.7 | 650 |
|   | 13-06 | 60 | 0.673 | too brittle to test | | |
| C | 13-09 | 0 | 0.891 | 589 | 15.6 | 16.9 |
|   | 13-01 | 50 | 0.672 | 341 [58%] | 2.8 | 50.8 |
|   | 13-02 | 60 | 0.673 | 314 [53%] | 2.5 | 82.3 |
| D | 13-12 | 0 | 0.858 | 26.8 | 0.083 | 0.27 |
|   | 13-07 | 50 | 0.669 | 9.2 [34%] | 0.127 | 1.81 |
|   | 13-08 | 60 | 0.681 | 6.1 [22%] | 0.167 | 3.04 |

The modulus, Ultimate Tensile Strength (UTS) and Elongation at break (Eb) were measured at room temperature on BS Type 2 dumbells on an Instron Series IX automated materials testing system 1.32, using a laser non-contacting (NAMAS calibrated) extensometer. A strain rate of 5 mm/min was used for 1 min in order to obtain the modulus (from the slope of the initial linear stress/strain curve), and then a strain rate of 100 mm/min was used to obtain UTS and Eb values in those cases where the sample had not already broken.

COMMENTS on the above illustrative examples:

Polymer A: These were the easiest to process. They gave low-density compounds with very good mechanical properties.

Polymer B: These were slightly more difficult to process (longer mixing time and higher torque). They gave low-density compounds, but the compounds were too brittle to be of use.

Polymer C: These were the most difficult formulations to process, but they gave low-density compounds with good mechanical properties. The compounds were less flexible (lower modulus) and of lower elasticity (lower Eb values) than the Polymer A formulations.

Polymer D: These were more difficult to process than either the Polymer A or Polymer B formulations. They gave low-density compounds but with very poor mechanical properties. The compounds had little strength (low UTS values) and low elasticity (low EB values), but could be useful as cable-filling compounds where high strength and elasticity are not critical.

The low density material may be used in any of the following ways to produce the buoyancy required for sub-sea tether cables.

1) The pelletized material is processed into solid rods, of circular cross-section, under suitable conditions using conventional extrusion techniques. The diameter of these rods is such that they fill the interstices of large component wires and/or cables to produce a more fully packed and rounder cross-section which will result in a rounder finished cable (when further component layers and sheathing layers are added) that is better able to resist the possible effects of large hydrostatic pressures acting on the cable when submerged at depth. The low density rods are assembled along with the component wires (insulated copper conductors) and cables on a planetary cable machine in the form of a helical, circular layer. The length of one turn of any layer is approximately equivalent to 16 times the diameter of that layer.

2) As in 1 above, the pelletized low-density material is processed into solid rods, of circular cross-section with diameters which correspond to the diameters of the component wires in the cable e.g. 2.15 mm. These rods are then laid up as in 1 above adjacent to the component wires in the form of a helical, circular layer, over other layers. This allows for a complete layer of elements when the number of wires required may be less than the number required for a complete layer and avoids the need to use wires of larger diameter than required electrically in order to complete a full layer.

3) The low density material may be added as filler material. In this instance the material is extruded under pressure to form a circular overall cross-section, but during this process the material is made to flow and fill the interstices between component wires and cables.

4) The low density material may be also be added as a separate layer, with annular cross-section, over component cable bundles and beneath outer sheathing layers. An example of this is an annular layer, of 4 mm thickness, with internal diameter of 32 mm and external diameter of 40 mm. This is applied by conventional sheathing extrusion techniques.

It has been found advantageous in all cases to use a portion of the micro-balls filtered out from commercially-available supplies of such micro-balls, which portion passes through a 45 micro-meter sieve (that is, a sieve, for example of stainless steel wire mesh, having that nominal aperture size), preferably a 34 micro-meter sieve, a majority or substantially all of the selected micro-balls preferably having diameters in the range from 10 to 45, more preferably 10 to 34, micrometers. The composition containing the aforementioned 3M micro-balls as received undergoes more than 10% compression of its original volume, indicating significant crushing of micro-balls, at pressures of 25–30 MPa, approximating to the pressure experienced 2.5–3 km under water. The compound containing that portion (about 50% by weight) of the micro-balls retained by a 45 micro-meter sieve is similarly crushed at pressures of 25–30 MPa. However, the compound containing that portion of the micro-balls passing through a 34 micro-meter sieve experiences less than 5% crushing at 50 MPa (about 5 km under sea), and even the compound of that portion which passes the 45 micro-meter sieve but is retained by the 34 micrometer sieve undergoes less than 10% crushing at 50 MPa. Surprisingly, these stronger compositions are still able to provide acceptable degrees of buoyancy and ease of processing.

What is claimed is:

1. A composition comprising,
   (a) at least 30% and not greater than 70% by volume, based on the volume of the composition, of a melt processable polymer matrix component consisting of at least one of (i) a thermoplastic polyolefin elastomer of room temperature density less than 0.9 g/cc and (ii) a thermoplastic olefin/(ester or acid) copolymer elastomer, and
   (b) dispersed in said matrix, at least 30% by volume, based on the volume of the composition, of inorganic micro-balls of room-temperature density less than 0.6 g/cc, at least 80% by weight of the micro-balls having a maximum dimension less than 300 $\mu$m.

2. A composition according to claim 1 comprising 40 to 70% by volume of the micro-balls.

3. A composition according to claim 1 wherein the density of the said polyolefin elastomer is less than 0.895 g/cc.

4. A composition according to claim 1 wherein the density of the micro-balls is less than 0.5 g/cc.

5. A composition according to claim 1 wherein the crystallinity of the polymer component determined by X-ray diffraction is less than 30%.

6. A composition according to claim 1 wherein the modulus of the polymer component is less than 100 and greater than 0.2.

7. A composition according to claim 6 wherein said modulus is less than 20 and greater than 6.

8. A composition according to claim 1 wherein the polymer component comprises said polyolefin elastomer and the polyolefin elastomer comprises a polyolefin homopolymer or an olefin/olefin copolymer, hydrogenated or unhydrogenated.

9. A composition according to claim 8 wherein the polyolefin elastomer is a product of metallocene-catalyzed polymerisation.

10. A composition according to claim 9 wherein the polymer component consists substantially of the polyolefin elastomer.

11. A composition according to claim 9 wherein the polyolefin elastomer is a saturated ethylene-octene copolymer.

12. A composition according to claim 1 wherein the polymer component comprises said olefin/(ester or acid) elastomer and the olefin/(ester or acid) elastomer comprises a copolymer of ethylene with a co-monomer selected from vinyl esters, acrylic acid, methacrylic acid, esters of acrylic acid and esters of methacrylic acid, and the copolymer contains from 25 to 75 mol % of the co-monomer.

13. A composition according to claim 1 which has been melt processed and which has a density not more than 20% greater than a theoretical density calculated from the initial densities and proportions of the polymer component and micro-balls used as starting materials.

14. A composition according to claim 1 which has been melt extruded at a pressure not greater than 27.6 MPa.

15. A composition according to claim 1 wherein a majority of the micro-balls have diameters in the range from 10 to 45 micrometers.

16. A composition according to claim 1 in a form selected from low voltage electrical insulation extruded on an electrical wire, a cable jacket, buoyancy-adjusting filling for a cable or harness, dielectric material between the inner and outer conductors of a co-axial electrical cable, thermal insulation, and extruded cable filler rods laid up together with other elongate cable components to form a cable.

17. A composition obtained by a process which comprises the step of mixing together
 (a) a known volume of a polyolefin which (i) has been prepared by metallocene-catalyzed polymerization of at least two olefins, (ii) has a room temperature density of less than 0.9 g/cc, and (iii) has an elongation to break of at least 800%; and
 (b) a known volume of microballs which (i) have a room temperature density of less than 0.6 g/cc and (ii) pass through a 45 micrometer sieve;
the known volume of the polyolefin being at least 30% of the volume of the composition, and the known volume of the microballs being 40 to 70% of the volume of the composition.

18. A composition according to claim 17 wherein the polyolefin is a copolymer of ethylene and octene.

19. A composition according to claim 17 wherein the process includes, after the step of mixing the polyolefin and the microballs, the step of melt extruding the mixture.

* * * * *